Patented Mar. 15, 1949

2,464,240

UNITED STATES PATENT OFFICE 2,464,240

THERAPEUTIC MATERIAL AND METHOD OF OBTAINING THE SAME

Ernst T. Krebs and Ernst T. Krebs, Jr., San Francisco, Calif.

No Drawing. Application November 20, 1943, Serial No. 511,186

2 Claims. (Cl. 260—236.5)

This invention relates to a preparation for relief and immunity to persons afflicted with asthma and allied diseases, and a method of producing the same. The present application is a continuation in part of our former application entitled "A therapeutic chemical principle for preventing intestinal putrefaction," filed August 25, 1942, Serial No. 456,296, now abandoned.

It has long been the opinion of applicants that many bodily ailments are due to toxic products or so-called allergens. These products, toxic to the body, may be intrinsic, that is, produced by the body and not being adequately eliminated, become an irritant to the tissues of the body, or they may be extrinsic, entering from without the body. The former may be histamine, indol, or any of the products of protein decomposition or perverted metabolism. The latter, or extrinsic allergen, may be almost anything containing proteinaceous material to which a particular person may be sensitive.

These toxic products or allergens are an irritant to the tissues of the body to a varying degree, and may cause affections of the skin, respiratory tract, painful nerve and joint affections, and even cell proliferation. The extrinsic toxic products or allergens may cause such affections as eczema and asthma. The intrinsic toxicities may cause affections such as arthritis, neuritis, also eczema, asthma and other affections. There exist normally no enzymes, antibodies, or other chemical agents in the body to dissociate these toxic bodies into harmless products.

Applicants have discovered that there is present a chemical principle or association of compounds in the kernel of seeds of the Prunus family and in other seeds and grains, particularly rice and barley, which have the property of detoxifying toxic products formed in the human system, and that when this chemical principle or association of compounds is introduced into the human system said chemical principle or association of compounds directly or indirectly cause a change in the human system such that the toxic bodies no longer produce harmful results above specified.

The present invention consists not only in the preparation itself but also in the method of extracting the chemical principle or association of compounds from seeds of the Prunus family and from other seeds and grains, and particularly rice and barley. Broadly, this method comprises preliminarily treating the kernels of the seeds with a solvent for the fats and oils present therein, substantially completely removing the fat and solvent from the seed material, subjecting the fat-free seeds to aqueous extraction to produce an aqueous extract of the active chemical principle of the Prunus seeds, and thereafter precipitating said active principle from said aqueous extract. Preferably, prior to the precipitation of the active principle, the emulsin is removed. As is well known, the term "emulsin" denotes a glucoside-splitting enzyme or ferment present in the seed. The emulsin is characterized by the property of being soluble in water, but is insoluble in ether and alcohol.

In the preferred form of the invention, the aqueous extraction is carried out in the presence of a small amount of an acid to thereby insure substantially complete extraction of the chemical principle from the seed being treated.

The primary object of the present invention is to provide a preparation which may be introduced parenterally into the blood stream, and when so introduced functions as a detoxifying agent or antigen, thereby protecting the body against these toxic products or bodies.

It is also an object of the invention to provide a simple and efficient method of extracting the active chemical principle of seeds and grains of the character herein set forth in a pure form substantially free of fats, oils and emulsin.

The active principle may be isolated in the following manner. Unblanched kernels of the seeds of the Prunus family, as, for example, apricots, and other seeds and grains, and particularly unblanched rice and barley, are preferably reduced to impalpable pulp and placed in a percolator with a layer of fine mesh gauze over its lower opening. Kernels of the seeds of the Prunus family or other seeds or grains treated are preferably in the unblanched state. In order to remove fats and oils from the kernels of the seeds of the Prunus family, as, for example, kernels of apricot seeds, peach seeds, almonds, etc., the kernels in a finely divided state are treated with a solvent for said fats and oils. Any of the well known solvents used for removing fats and oils may be used, provided the solvent does not inactivate the chemical principle which it is desired to recover from the kernels of the apricots, and, further, can be easily and simply removed from the kernels, so that the aqueous extract of the apricot seeds containing the desired principle may be substantially fat-free and oil-free. Ketones, ethers, alcohols and alkyl acetates may be used. Acetone is the preferred preliminary fat solvent, as it also serves best to dehydrate the seed pulp. In place of acetone, ether may be used, that is, ethyl ether, or the fats and oils may be removed by two steps, as by a preliminary extraction with acetone followed by extraction with ether or any other suitable fat solvent. In general, for every 500 grams of apricot seed pulp present, taken on a dry basis, 3000 cc. of acetone should be added, followed by 1000 cc. of ether. The fat-removing solvent is percolated through the pulp until the fats and oils are substantially removed. The ether used as a fat solvent is highly advantageous, because it is very volatile and capable of easy removal from the seed pulp, as, for example, by subjecting the seed pulp to drying. Therefore, in the preferred form of the invention the fat solvent is one which may be easily and efficiently removed.

After the pulp has been treated to remove the oils and fats, whatever solvent remains in the seed pulp may be removed in a suitable manner, as, for example, by drying the pulp. When this procedure is employed to remove the fat solvent present in the pulp, the latter may be spread upon a suitable base material, as, for example, white blotting paper, to dry. During this drying the pulp becomes somewhat acid in reaction. When the pulp is thoroughly dry, which is essential to insure complete removal of all the ether, it is again placed in the percolator and about 1,000 cc. of distilled water is poured on the pulp for every 500 grams of kernel seeds used. The seed pulp is macerated for a suitable length of time until all the emulsin and the active extract therein have been substantially dissolved by the water, said maceration usually requiring from 4 to 5 hours. However, the maceration will depend upon a number of factors, including the quantity of the seed treated and the particular kind of seed. After the maceration is substantially complete, the stop-cock of the percolator is opened and percolation is allowed to proceed. This percolation is carried out at room temperature, that is, between 40° and 100° F. When percolation ceases, preferably the solid seed pulp residue remaining afer separation of the extract therefrom may be treated to recover the residual extract present in the pulp. While this may be done in any suitable manner, satisfactory results have been obtained by treating the pulp with a dilute acid, as, for example, a dilute solution of hydrochloric acid made by adding one part of U. S. P. of hydrochloric acid to 1000 parts of distilled water to thereby provide a percolate of 1,000 cc. for each 500 grams of kernel seeds used. This dilute solution of hydrochloric acid insures a better solution of the residual extract present in the pulp. Instead of using a dilute solution of sulphuric acid or hydrochloric acid, there may be used dilute solutions of phosphoric acid; dilute solutions of organic acids, such as acetic acid and the like may also be used, but do not give such satisfactory results.

The extract above obtained contains emulsin and other enzymes, and it is desirable that the emulsin is substantially removed. This may be accomplished by adding any agent which will precipitate the emulsin, subject to the limitation that the precipitating agent will not inactivate the final product. In practice, it has been found satisfactory to add to the percolate obtained as above set forth, an equal volume of acetone and to agitate vigorously to insure the substantially complete precipitation of the emulsin present in the percolate. Thereafter, the resulting mass is filtered to separate the precipitated emulsin. In place of acetone as a precipitating agent for the emulsin, any of the alcohols may be used, such as ethyl alcohol, propyl alcohol, butyl alcohol, iso-propyl alcohol, iso-butyl alcohol, and the like. Acids, in general, may also be employed and precipitation may also be brought about by controlled heat. However, acetone is preferred. The active chemical principle present in the aqueous extract may be recovered by precipitation therefrom. Any suitable precipitating agent may be used, but in practice it has been found desirable to add to the filtrate 5% in volume of a 10% solution of ammonium alum. After the ammonium alum has been added, the solution is agitated and poured into a tall cylinder to settle. Other precipitating agents which may be employed are sodium and potassium alum, aluminum sulphate, ammonium sulphate, and any other agents.

When the extract has been precipitated, or in other words, completely settled to the bottom of the precipitation vessel, the supernatant liquid is drawn off. The extract in the acetone-aqueous mixture is poured onto filter paper, and when the filtration has ceased the precipitate on the filter is washed with ethyl alcohol and ether for the purpose of dehydration. Any washing medium may be used which will not dissolve or inactivate the precipitate but will dehydrate the same. Thereafter, the precipitate is preferably dried in any suitable manner, as, for example, over phosphoric pentoxide, sulphuric acid, or calcium chloride, or in any suitable desiccator at a low heat. When the precipitated extract is thoroughly dry, it is weighed in units of milligrams and dispersed in a solvent or carrier medium, as, for example, in sterile saline solvent (normal saline or Ringler's solution), and to the solution there is added .25% of tricresol or phenol as prescribed by the National Institute of Health of the United States Public Health Service.

Unblanched rice and barley are treated in the identical manner described for seeds of the Prunus family.

Treatment

Intravenous or intramuscular injections of this preparation in solution as specified are very helpful in relieving the pain which is a concomitant of acute conditions of neuritis, arthritis, myalgia, and like pathological conditions brought about by the presence of toxic products in the human system. It has been observed that when the extract of the present invention is introduced into the human or animal system, relief begins almost immediately, and one injection in the dosage hereinafter specified gives relief for two or more days, although in some cases one injection will permanently relieve the condition. The same treatment is given for asthma and allied diseases, and relief, immunization and permanent recoveries have been effected.

A solution containing the preparation is given parenterally in 0.01 to 0.05 gram doses. The product thus administered apparently functions as a detoxifying and immunizing agent for harmful toxic products produced in the body or introduced into the body from without. The preparation may also be introduced by oral administration, in which case pills containing from 0.01 to 0.13 grams of the material are employed. The pills, however, should be enteric-coated, so as to be soluble in the intestines only.

What is claimed is:

1. The method of preparing an extract from seeds consisting of seeds of the Prunus family and seeds of rice and barley for introduction into the human system comprising reducing the seeds to a finely divided state, removing the fats and oils present in the resulting mass by treatment with a fat-and-oil-extracting solvent, macerating the fat and oil free seed mass in an aqueous medium to dissolve from said mass the active chemical detoxifying principle present therein and which it is desired to introduce into the human system, and also to simultaneously dissolve a substantial amount of the emulsin present in the seed mass which it is not desired to introduce into the human system, separating the aqueous extract from the solid seed mass, precipitating the emulsin with a precipitating agent selected from the group consisting of acetone and a lower aliphatic alcohol, separating the precipitated emulsin, precipitating the active principle from the solution by adding thereto a precipitating agent selected from the group consisting of ammonium alum, sodium alum, potassium alum, aluminum sulfate, and ammonium sulfate, allowing the solution to stand until the precipitate has completely settled, and separating and drying the precipitate.

2. A preparation for the immunization of toxic products present in the human or animal system, the active constituent of which is the active principle obtained by the method of claim 1.

ERNST T. KREBS.
ERNST T. KREBS, Jr.

REFERENCES CITED

The following references are of record in the file of this patent:

UNITED STATES PATENTS

| Number | Name | Date |
|---|---|---|
| 1,796,070 | Waterhouse | Mar. 10, 1931 |
| 1,913,515 | Schmitt | June 13, 1933 |
| 2,119,234 | Krebs et al. | May 31, 1938 |
| 2,224,352 | Krebs et al. | Dec. 10, 1940 |
| 2,242,062 | Evertz | May 13, 1941 |
| 2,273,031 | Folkers | Feb. 17, 1942 |
| 2,282,779 | Musher | May 12, 1942 |
| 2,282,781 | Musher | May 12, 1942 |
| 2,314,282 | Levin | Mar. 16, 1943 |
| 2,316,311 | Boatner | Apr. 13, 1943 |

FOREIGN PATENTS

| Number | Country | Date |
|---|---|---|
| 647,542 | Germany | July 7, 1937 |

OTHER REFERENCES

Waksman et al.: "Enzymes" (William & Wilkins Co.; Baltimore; 1926), pages 185–189.

Hagers: Handbuch der Pharm. Praxis (Julius Springer; Berlin; 1925), vol. I, pp. 413, 414, 416, and 420.